(12) United States Patent
Fan

(10) Patent No.: US 9,470,318 B2
(45) Date of Patent: Oct. 18, 2016

(54) ECCENTRIC VALVE AND MANUFACTURING METHOD THEREOF

(71) Applicant: JDV CONTROL VALVES CO., LTD., Yangmei, Taoyuan County (TW)

(72) Inventor: Yi-Ming Fan, Yangmei (TW)

(73) Assignee: JDV CONTROL VALVES CO., LTD., Yangmei, Taoyuan County (TW)

( * ) Notice: Subject to any disclaimer, the term of this patent is extended or adjusted under 35 U.S.C. 154(b) by 97 days.

(21) Appl. No.: 14/617,693

(22) Filed: Feb. 9, 2015

(65) Prior Publication Data

US 2016/0169395 A1    Jun. 16, 2016

(30) Foreign Application Priority Data

Dec. 16, 2014    (TW) .............................. 103143797 A

(51) Int. Cl.
*F16K 1/226* (2006.01)

(52) U.S. Cl.
CPC ............. *F16K 1/2261* (2013.01); *F16K 1/226* (2013.01); *F16K 1/2263* (2013.01)

(58) Field of Classification Search
CPC .......... F16K 1/22; F16K 1/222; F16K 1/226; F16K 1/2261; F16K 1/2263; F16K 1/2265; F16K 1/228
USPC ......................................... 251/305, 306, 308
See application file for complete search history.

(56) References Cited

U.S. PATENT DOCUMENTS

| 3,931,955 A * | 1/1976 | Jacobs .................... F16K 1/226 251/173 |
| 5,975,494 A | 11/1999 | Gasaway |
| 2008/0173841 A1* | 7/2008 | Sisk ...................... F16K 1/2265 251/306 |
| 2012/0061603 A1* | 3/2012 | Kurihara ................. F16K 1/222 251/305 |
| 2013/0299729 A1* | 11/2013 | Parrie ................... F16K 1/2261 251/314 |
| 2016/0178067 A1* | 6/2016 | Abouelleil ................ F16K 1/22 251/308 |

* cited by examiner

*Primary Examiner* — Mary McManmon
*Assistant Examiner* — Ian Paquette
(74) *Attorney, Agent, or Firm* — Muncy, Geissler, Olds & Lowe, P.C.

(57) ABSTRACT

Provided is an eccentric valve and a manufacturing method thereof. The eccentric valve has a tri-offset structure, and comprises: a valve body, a valve seat, a valve unit, a valve stem and a seal. The disc-shaped valve unit is disposed in a through hole centered in the valve body. The valve stem penetrates shaft holes on the valve unit and the valve body. Rotating the valve stem causes rotation of the valve unit for closing/opening the through hole. The valve seat is mounted on the inner surface of the through hole, and the seal is mounted on the outer surface of the valve unit. When the through hole is closed, the valve seat and the seal are mutually engaged. The inner surface of the valve seat is part of an oblique cone. The seal is a centrosymmetric ring, of which the outer surface is cambered.

4 Claims, 6 Drawing Sheets

| Take a radial cross-section passing through the center of the valve seat such that the radial cross-section intersects the inner surface within the range of thickness T of the valve seat to form a first line segment and a second line segment, the first line segment and the second line segment respectively locating on two opposite sides of the first axial centerline with a 180 degree difference. | — 641 |

| Use the first axial centerline as a mirror line to create a mirror line segment from the second line segment, the mirror line segment and the first line segment locating on the same side of the first axial centerline. | — 642 |

| Determine an arc tangent to the first line segment and the mirror line segment, and take the radius of curvature of the arc as the radius of curvature for the outer surface of the seal on any radial cross-section. | — 643 |

Fig. 7

| Determine a vertical distance L between the peak of the oblique cone and the center of the valve stem. | — 68 |

| Determine a vertical distance D between the peak of the oblique cone and the first axial centerline. | — 69 |

| Determine a vertical distance H between an axial centerline of the seal and the centers of the pair of second shaft holes of the valve unit. | — 70 |

Fig. 8

ECCENTRIC VALVE AND MANUFACTURING METHOD THEREOF

BACKGROUND OF THE INVENTION

1. Technical Field

The present invention relates to an eccentric valve, and particularly to an eccentric valve having a tri-offset structure.

2. Description of the Prior Art

A butterfly valve, which is a commonly-used fluid valve, includes an axially-penetrating shaft hole for the insertion of a drive shaft whereby a valve unit of the butterfly valve is driven and rotated, so the valve unit can be opened or closed, wherein the valve unit is designed to have a tri-offset structure. A conventional eccentric valve includes a valve body having a valve chamber; a valve stem penetrating the valve body; a valve seat received in the valve chamber; a seal which is an O-ring, and is asymmetric on both ends of a radial section thereof; a valve unit provided with a shaft hole in an axial direction thereof, the shaft hole being configured to allow the valve stem to penetrate therethrough for controlling the opening and closing of the valve unit. The seal is disposed on the valve unit and configured to be tightly fit to the valve seat when the valve unit is closed.

The eccentric valve is provided with a tri-offset structure. The seal diverges from the paired shaft holes of the valve unit (i.e., diverges from the valve stem), and the radial centerline of the seal is away from the center of the valve stem by a vertical distance, forming a first offset. Next, a second axial centerlines of the valve stem is away from a first axial centerline by a distance, forming a second offset. Next, an inner surface of the valve seat extends to form a tapered shape, the vertical distance between the peak of the tapered shape and the first axial centerline being not greater than the radius of the valve unit, thus forming a third offset. The tri-offset structure has been clearly described in FIG. 4 and description of the issued U.S. Pat. No. 5,975,494. Conventionally, a side of the tapered shape is parallel to the axial direction of piping, the seal therefore needs to be machined according to various angles of the piping to form an angle providing tight fitting.

Conventionally, the valve seat is tailored to the design of the tri-offset structure. The slope of the inner side of the valve seat needs to match the slope of the aforementioned offset tapered shape. In other words, the upper part of the inner side of the valve seat is oblique, while the lower part of the inner side of the valve seat is horizontal. These two slopes match the slopes of the tapered shape, and the slopes of the inner side of the entire valve seat continuously vary from the top down.

With the aforementioned tapered shape design, an annular seal needs to be formed as a radially asymmetric circle with respect to its axis, in order to enable the seal to tightly seal the valve body. As such, when the circularly asymmetric seal is mounted on the outer side of the valve unit against the valve set, the seal can firmly contact the inner side of the valve seat at various positions on the edge of the seal, forming a tight sealing. Because the seal is a radially asymmetric circle with respect to its axis, it is difficult to be manufactured. Also, the mounting of the seal is directional. When being mounted, such seal needs to be inserted into the valve body. However, as the seal slides, the tight sealing will be damaged, causing leakage.

SUMMARY OF THE INVENTION

The present invention provides an eccentric valve, comprising: a valve body, a through hole being provided at the center of the valve body, and a first shaft hole passing through the through hole being provided in a longitudinal direction of the valve body; a valve seat which is ring-shaped, an inner surface of the valve seat consisting a part of a tapered face of an oblique cone, the valve seat being accommodated in the through hole and disposed in the valve body, the peak of the oblique cone offsetting a first axial centerline passing through the center of the through hole; a valve unit which is disc-shaped and has an annular surface, a pair of second shaft holes being provided in a longitudinal direction of the valve unit, the valve unit being accommodated in the through hole, the pair of second shaft holes being aligned with the first shaft hole; a valve stem which is bar-shaped, the valve stem penetrating the first shaft hole, passing through the through hole and penetrating the pair of second shaft holes, thereby controlling the rotation of the valve unit in the through hole, a second axial centerline passing through the center of the valve stem being oblique with respect to the first axial centerline; and a seal which is a centrosymmetric ring, an outer surface of the seal being a cambered surface with a fixed curvature, the seal being mounted on the annular surface of the valve unit, the disposal position of the seal on the annular surface of the valve unit deviating from the disposal position of the pair of second shaft holes, wherein when the valve unit rotates in the through hole to a position where the through hole is completely closed, on any radial cross-section of the eccentric valve, the outer surface of the seal presses against the inner surface of the valve seat, and no gap exists between the outer surface and the inner surface of the valve seat, each point where the outer surface of the seal presses against the inner surface of the valve seat is a point of tangency, with all points of tangency not locating on a same plane.

The present invention provides a method for manufacturing an eccentric valve, comprising: providing a valve body having a through hole disposed at the center thereof, and a first shaft hole passing through the through hole and disposed in a longitudinal direction of the valve body, the centerline of the first shaft hole diverging from the center of the through hole; providing a valve seat which is ring-shaped, with an inner surface thereof consisting a part of a tapered face of an oblique cone, the valve seat having a thickness in the axial direction thereof; accommodating the valve seat in the through hole and disposing the valve seat in the valve body, enabling the peak of the oblique cone to diverge from a first axial centerline passing through the center of the through hole, and enabling the accommodated position of the valve seat to deviate from the position of the first shaft hole; providing a disc-shaped valve unit having an annular surface and a pair of second shaft holes provided in a longitudinal direction of the valve unit; providing a seal which is a centrosymmetric ring, an outer surface thereof being a cambered surface with a fixed curvature; disposing the seal on the annular surface of the valve unit, enabling the disposal position of the seal on the annular surface to deviate from the disposal position of the pair of second shaft holes; accommodating the valve unit in the through hole and aligning the pair of second shaft holes with the first shaft hole, enabling the outer surface of the seal to face the inner surface of the valve seat; and providing a bar-like valve stem configured to penetrate the first shaft hole, pass through the through hole and penetrate the pair of second shaft holes, so as to control the rotation of the valve unit in the through hole, wherein the curvature of the outer surface of the seal on any radial cross-section is determined through the following steps: taking a radial cross-section passing through the center of the valve seat such that the radial cross-section intersects the inner surface within the range of thickness of the valve seat to form a first line segment and a second line segment, the first line segment and the second line segment respectively locating on two opposite sides of the first axial centerline with a 180 degree difference, and the absolute values of the slopes for the first line segment and the second line segment being mutually different; using the first axial centerline as a mirror line to create a mirror line segment from the second line segment, the mirror line segment and the first line segment locating on the same side of the first axial centerline; and determining an arc tangent to the first line segment and the mirror line segment, and taking the radius of curvature of the arc as the radius of curvature for the outer surface of the seal on any radial cross-section.

For the eccentric valve of the present invention, there is no requirement of directionality for the engagement of the seal and the valve seat thereof. The engagement of the seal and the valve seat will be unaffected regardless of the angle that the valve seat is fitted to the valve body, or that the seal is fitted to the valve unit. Thus, the required time for assembling the eccentric valve of the present invention can be decreased.

BRIEF DESCRIPTION OF THE DRAWINGS

FIG. 7 is a schematic flow chart for determining the curvature of the outer surface of the seal according to the present invention.

FIG. 8 is a schematic flow chart showing the manufacturing method of the eccentric valve according to the present invention.

DETAILED DESCRIPTION OF THE PREFERRED EMBODIMENTS

Figure 1:
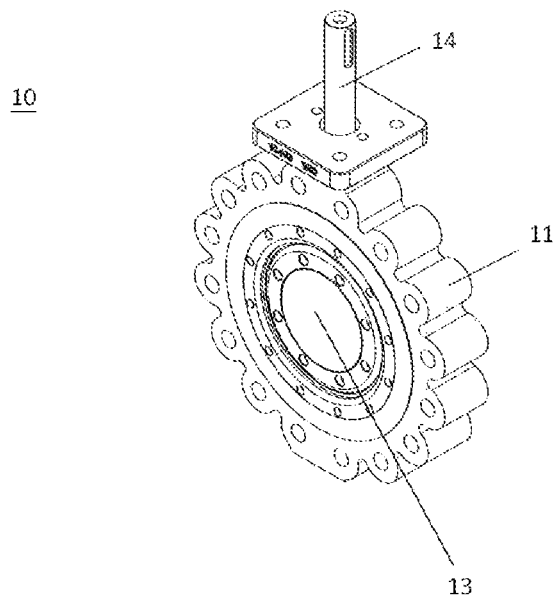
FIG. 1 is a schematic view of an eccentric valve according to the present invention.

The structure, resulting effect and advantages of the eccentric valve according to the present invention will be described below in detail with reference to the accompanying drawings and preferred embodiments of the eccentric valve according to the present invention.

Please refer to FIG. 1 to FIG. 4. An eccentric valve 10 according to an embodiment of the present invention is shown to include the following:

A valve body 11, an inner annular wall thereof being formed into a through hole 111, and a first shaft hole 112 penetrating the through hole 111 in the longitudinal direction of the valve body 11. A valve seat 12 is accommodated in the through hole 111. The valve seat 12 is substantially ring-shaped, with an inner surface 121 thereof constituting a part of a tapered surface of an oblique cone 1210. The valve seat 12 is provided in the valve body 11, wherein the peak of the oblique cone 1210 offsets from a first axial centerline 1111 passing through the center of the through hole 111. The valve seat 12 in this embodiment is a detachable structure.

A disc-shaped valve unit 13 having an annular surface 131. The valve unit 13 is provided with a pair of second shaft holes 132 in the longitudinal direction of the valve unit 13. The valve unit 13 is accommodated in the through hole 111 of the valve body 11, with the pair of second shaft holes 132 being aligned with the first shaft hole 112.

A bar-like valve stem 14 penetrating the first shaft hole 112 of the valve body 11, through the through hole 111 and penetrating the second shaft holes 132. The rotation of the valve stem 14 causes the valve unit 13 to rotate in the through hole 111. A second axial centerline 141 passing through the center of the valve stem 14 is oblique with respect to the first axial centerline 1111 and away therefrom by a vertical distance K. In other embodiments, the top of the valve stem 14 may be connected to a valve operator (not shown) for driving the valve unit 13 to rotate.

Figure 4:
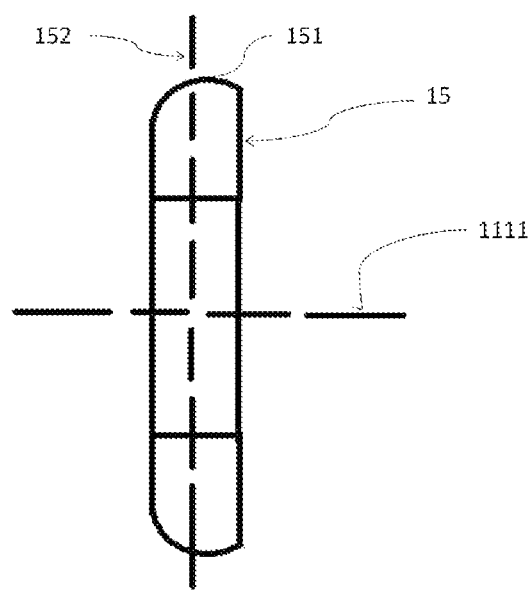
FIG. 4 is a schematic side view of a seal according to the present invention.

A seal 15 made of metal. As shown in FIG. 4, the seal 15 is a centrosymmetric ring, and an outer surface 151 thereof is a cambered surface with a fixed curvature, wherein the radius of curvature of the outer surface 151 ranges from 8 mm to 60 mm. The radius of curvature is determined depending on the type of the eccentric valve. The seal 15 is mounted on the annular surface 131 of the valve unit 13, and is disposed at a position on the annular surface 131 that deviates from the aforementioned pair of second shaft holes 132.

Figure 2:
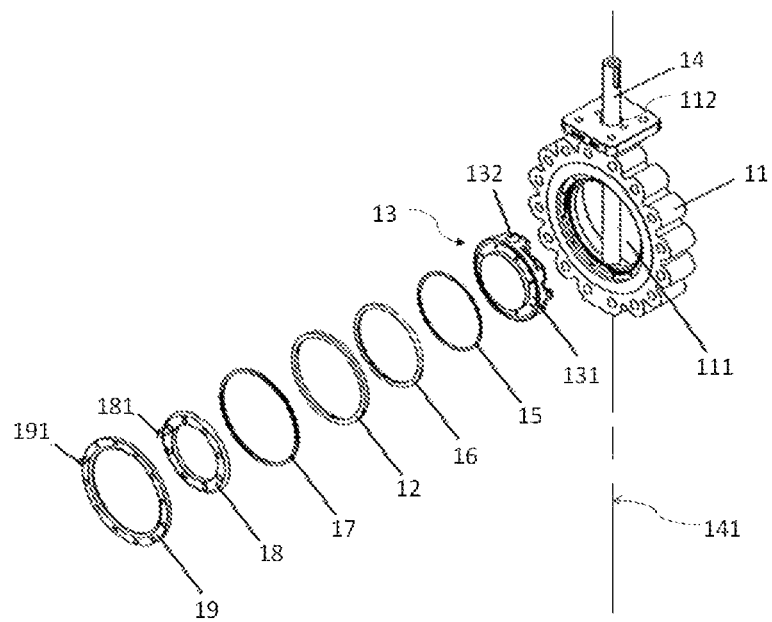
FIG. 2 is an schematic explosive view of the eccentric valve according to the present invention.
Figure 3:
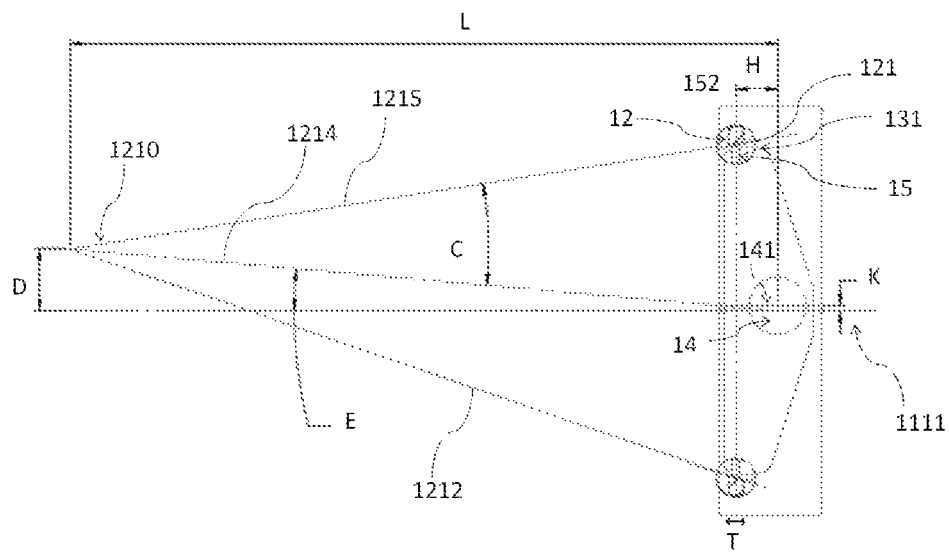
FIG. 3 is a cross-sectional schematic view showing an assembly of respective components of the eccentric valve according to the present invention.

Please refer to both FIG. 2 and FIG. 3. FIG. 2 is an schematic explosive view of the eccentric valve according to the present invention, and FIG. 3 is a cross-sectional schematic view showing an assembly of respective components of the eccentric valve according to the present invention. When being assembled, the valve seat 12 and a seal ring 17 are first placed into the valve body 11 from one side of the through hole of the valve body 11, then a valve seat cover 19 is fastened to the valve body with a screw 191, thereby fixing the valve seat 12 and the seal ring 17 between the valve seal cover 19 and the valve body 11. Next, the seal 15 and an annular liner 16 are installed to a side of the valve unit 13 such that the seal 15 and the annular liner 16 are mounted onto the valve unit 13, and that the seal 15 and the annular liner 16 are adjacent to each other. Then a valve unit cover 18 is fastened to the valve unit 13 with a screw 181 for fastening the seal 15 and the annular liner 16. Next, the valve unit 13 is placed into the valve body 11, so that the outer edge of the seal 15 and the inner edge of the valve seat 12 press against each other. The valve stem 14 then penetrates the first shaft hole 112 and the second shaft holes 132 so as to hold the valve unit 13 and the valve body. In the present embodiment, once the valve body cover 18 is removed, the annular liner 16 and seal 15 can be detached, which is very convenient for maintenance.

As mentioned above, the valve unit 13 is placed in the through hole 111, and the rotation of the valve stem 14 can drive the valve unit 13 to rotate in the through hole 111. Accordingly, when the valve unit 13 rotates to a particular angle, the through hole 111 can be closed. Once the valve unit 13 rotates in the through hole 111 to a position where the through hole 111 is completely closed, on any radial cross-section of the valve 11 of the eccentric valve 10, the outer surface 151 of the seal 15 presses against the inner surface 121 of the valve seat 12 at a point thereon, and no gap exists between the outer surface 151 and the inner surface 121, i.e., both sides of the through hole 111 are completely separated. In addition, if each point where the outer surface 151 of the seal 15 and the inner surface 121 of the valve seat 12 press against each other is a point of tangency, all points of tangency will not locate on the same plane.

Next, as mentioned above and in FIG. 3, the radius of curvature R for the inner surface 121 of the valve seat 12 determines the oblique cone 1210. A vertical distance L presents between the peak of the oblique cone 1210 and the valve stem 14; a vertical distance D presents between the oblique cone 1210 and the first axial centerline 1111; a vertical distance H presents between the first axial centerline 1111 and the axial centerline 152 of the seal 15, and the valve seat 12 has a thickness T in the axial direction thereof, wherein the vertical distance D is smaller than the radius of the through hole 111 and ranges from 90 mm to 1500 mm. In addition, the connection between the peak of the oblique cone 1210 and the center of the valve stem 14 forms a connection line 1214. An included angle E presents between the connection line 1214 and the axial centerline 1111 and ranges from 2.5 to 10 degrees. The connection between any point on the inner surface 121 of the valve seat 12 and the peak of the oblique cone 1210 forms a connection line 1215. An included angle C presents between the connection line 1215 and the connection line 1214 and ranges from 10 to 30 degrees.

The valve body 11 of the present invention is provided with a tri-offset structure. Such tri-offset structure means that: the seal 15 diverges from the paired second shaft holes 132 (i.e., diverges from the valve stem 14), and the radial centerline 152 of the seal 15 is away from the center of the valve stem 14 by the vertical distance H, forming a first offset; the second axial centerline 141 of the valve stem 14 diverges from the first axial centerline 1111 by the distance K, forming a second offset; the oblique cone 1210 is formed by a first line segment 1211 and a second line segment 1212 (lines extending from both cross-sections of the inner surface 121 of the valve seat 12), and the vertical distance D between the peak of the oblique cone 1210 and the first axial centerline 1111 is not greater than the radius of the valve unit 13, as shown in FIG. 3, thus forming a third offset.

Figure 5A:
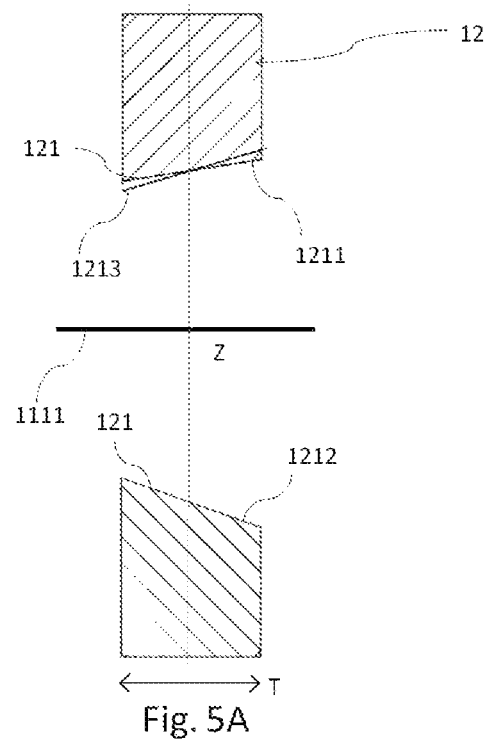
FIG. 5A is a schematic cross-sectional view of a valve seat according to the present invention.
Figure 5B:
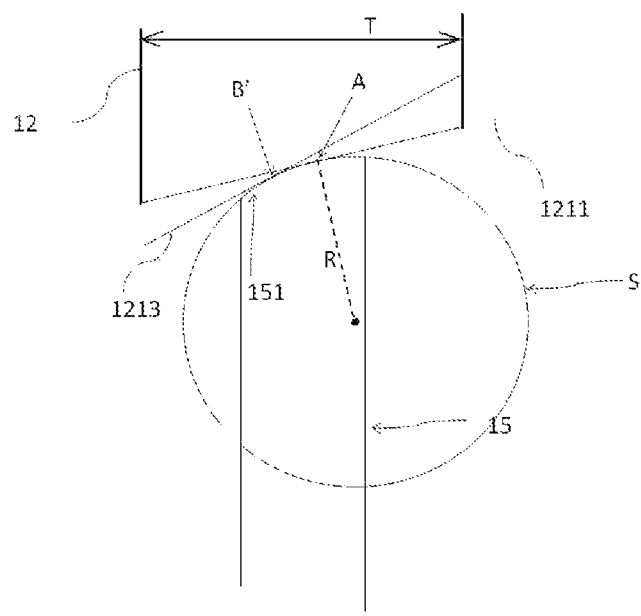
FIG. 5B is an enlarged schematic cross-sectional view of the valve seat according to the present invention.
Figure 5C:
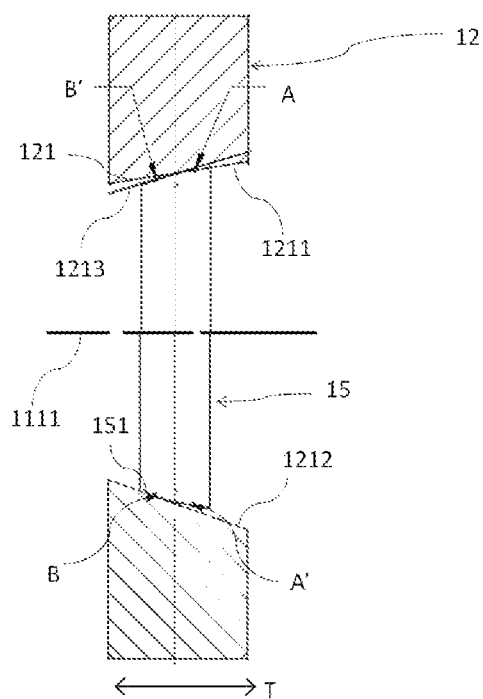
FIG. 5C is a schematic cross-sectional view showing an assembly of the valve seat and the seal according to the present invention.

It is to be described that the eccentric valve 10 of the present invention is provided with a special design. Please refer to FIG. 5A, which is a schematic cross-sectional view of the valve seat 12 according to the present invention. As shown in FIG. 5A, a radial cross-section is taken with respect to the center of the valve seat 12. Here, taking a radial cross-section with respect to the center of the valve seat 12 means taking a cross-section passing the center of the valve seat 12 along the diameter direction of the valve seat 12. Since the valve seat 12 is an annular ring, a normal vector of the cross-section passing the center of the valve seat 12 and taken along the diameter direction of the valve seat 12 is perpendicular to the axial centerline of annular ring of the valve seat 12. In the cross-sectional view, the valve seat 12 is divided into an upper part and a lower part. The inner surface 121 in the upper part intersects the radial center cross-section to form the first line segment 1211, while the radial center cross-section intersects the inner surface 121 in the lower part to form the second line segment 1212. The first and second line segments 1211 and 1212 locate on both sides of the first axial centerline 1111, respectively. Apparently, the first line segment 1211 and the second line segment 1212 will locate on the circular conical surface of the oblique cone 1210. Further, the absolute values of the slopes of the first and second line segments 1211 and 1212 are not equal. A mirror line segment 1213 can be obtained if the second line segment 1212 is mirrored with respect to the first axial centerline 1111. Apparently, the mirror line segment 1213 will intersect the first line segment 1211 at an intersection point, which locates within the range of the thickness T of the valve seat 12. Next, as shown in FIG. 5B, according to the specification of the eccentric valve 10, a radius is given for making a circle S tangent to both the first line segment 1211 and the mirror line segment 1213. The first line segment 1211 is tangent to the circle S at a point A, and the mirror line segment 1213 is tangent to the circle S at a point B'. The center of the circle S locates between the upper and lower parts of the valve seat 12. The radius of the circle S is the radius of curvature R for the outer surface 151 of the seal 15. This radius of curvature R may be used to form the outer surface 151 being tangent to various points on the inner surface 121 of the valve seat 12, so the seal 15 can be produced according to the radius of curvature R. As shown in FIG. 5C, for the seal 15 produced according to the radius of curvature R, the outer surface 151 of the seal 15 is an arc on the periphery of a circle having the radius R, and the seal 15 will be tangent to the first line segment 1211 at the point A, tangent to the second line segment 1212 at a point B, and tangent to the mirror line segment 1213 at the point B'. It is obvious that the points B and B' have a mirrored correlation with respect to the first axial centerline 1111. Additionally, the distance from the point A to the intersection point of the first line segment 1211 and mirror line segment 1213 is equal to that from the point B' to the intersection point of the first line segment 1211 and mirror line segment 1213.

Figure 6:
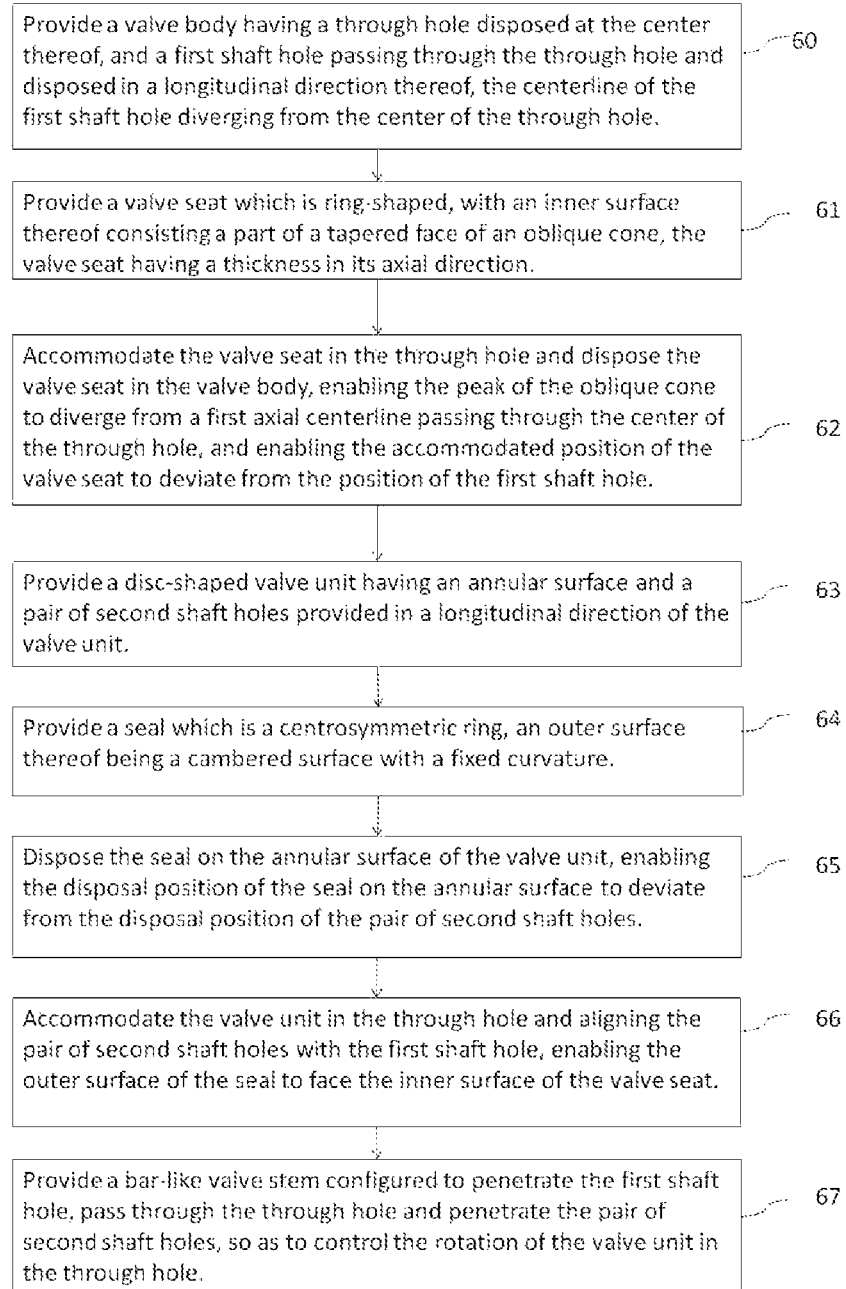
FIG. 6 is a schematic flow chart showing the manufacturing method of the eccentric valve according to the present invention.

From the description above, the eccentric valve 10 of the present invention is manufactured using a particular method. The eccentric valve 10 of the present invention cannot be accomplished only by achieving the aforementioned triple offset conditions. The detailed manufacturing method is illustrated in FIG. 6.

Step 60: provide a valve body 11 which has a through hole 111 at the center thereof and a first shaft hole 112 passing through the through hole 111 in the longitudinal direction of the valve body 11. The centerline of the first shaft hole 112 diverges from the center of the through hole 111.

Step 61: provide an annular valve seat 12, with the inner surface 121 thereof constituting a part of a tapered surface of an oblique cone 1210. The valve seat 12 has a thickness T in the axial direction.

Step 62: accommodate the valve seat 12 in the through hole 111. The valve seat 12 is provided in the valve body 11. The peak of the oblique cone 1210 offsets from a first axial centerline 1111 passing through the center of the through hole 111, and the accommodating position of the valve seat 12 diverges from the first shaft hole 112.

Step 63: provide a disc-like valve unit 13, which has an annular surface 131 and is provided with a pair of second shaft holes 132 in the longitudinal direction.

Step 64: provide a centrosymmetric and ring-shaped seal 15. An outer surface 151 of the seal 15 is a cambered surface with a fixed curvature.

Step 65: mount the seal 15 onto the annular surface 131 of the valve unit 13, and dispose the seal 15 at a position on the annular surface 131 that deviates from said pair of second shaft holes 132.

Step 66: accommodate the valve unit 13 in the through hole 13. Said pair of second shaft holes 132 are aligned with the first shaft hole 112, and the outer surface 151 of the seal 15 faces the inner surface 121 of the valve seat 12.

Step 67: provide a bar-like valve stem 14 penetrating the first shaft hole 112, through the through hole 111 and penetrating said pair of second shaft holes 132, so as to control the rotation of the valve unit 13 in the through hole 111.

Regarding the outer surface 151 of the seal 15 mentioned in the step 64, any radial radius of curvature R thereof is determined through the following steps, which are also shown in FIG. 7:

Step 641: take a radial cross-section passing through the center of the valve seat 12, as shown in FIG. 5A. The radial cross-section intersects the inner surface 121 within the range of thickness T of the valve seat 12 to form a first line segment 1211 and a second line segment 1212. The first line segment 1211 and the second line segment 1212 respectively locate on two opposite sides of the first axial centerline 1111 with a 180 degree difference. Both the first and second line segments 1211 and 1212 pass through the tapered surface of the oblique cone. In addition, the absolute values of the slopes for the first and second line segments 1211 and 1212 are mutually different.

Step 642: use the first axial centerline 1111 as a mirror line to create a mirror line segment 1213 from the second line segment 1212. The mirror line segment 1213 and the first line segment 1211 locate on the same side of the first axial centerline 1111.

Step 643: give a radius according to the specification of the eccentric valve 10, as shown in FIG. 5B, to make a circle S tangent to both the first line segment 1211 and the second line segment 1212. An arc tangent to the first line segment 1211 and the mirror line segment 1213 is picked from the circle S. The radius of the circle S is taken as the radius of curvature R for the outer surface 151 of the seal 15 on any radial cross-section, and the arc is taken as a part of the outer surface 151 of the seal 15. As shown in FIG. 5C, after the first line segment 1211 and the mirror line segment 1213 to which the arc is tangent and the radius of curvature R are determined, the arc can be determined, thereby obtaining the seal 15 from the arc.

Further, the aforementioned manufacturing method of the eccentric valve 10 includes the following steps, as shown in FIG. 8:

Step 68: determine a vertical distance L between the peak of the oblique cone 1210 and the center of the valve stem 14.

Step 69: determine a vertical distance D between the peak of the oblique cone 1210 and the first axial centerline 1111.

Step 70: determine a vertical distance H between a radial centerline 152 of the seal 15 and centers of the pair of second shaft holes 132 of the valve unit 13.

In order to meet the tri-offset design, it is necessary for the slope of the inner side of the aforementioned valve seat 12 to conform with the slope of the aforementioned oblique cone. In other words, as shown in FIG. 3, the upper inner side of the valve seat 12 has a more gentle slope, while the lower inner side of the valve seat 12 has a steeper slope. The slope of the entire inner side of the valve seat 12 continuously varies in sequence.

In the eccentric valve 10 of the present invention, when the through hole 111 is closed by the valve unit 13, the components engaging each other as well as closing the gap between the valve unit 13 and the valve body 11 are the valve seat 12 and the seal 15, wherein the inner surface 121 of the valve seat 12 is a part of the tapered surface of the oblique cone 1210, and the seal 15 is a symmetric circular ring. Obviously, there is no requirement of directionality for the engagement of the seal 15 and the valve seat 12. The engagement of the seal 15 and the valve seat 12 will be unaffected regardless of the angle that the valve seat 12 is fitted to the valve body, or that the seal 15 is fitted to the valve unit 13. Thus, the required time for assembling the eccentric valve 10 of the present invention can be decreased, and the possibility that the eccentric valve become unusable due to faulty assembling can also be reduced.

Summing up the above, the considerate design of the present invention definitely meets practical requirements. The present invention cures the deficiencies of existing eccentric valves, and is significantly advantageous over the conventional techniques. Accordingly, the present invention produces an improved effect and cannot be easily accomplished. Also, since the technique of the present invention is not published or disclosed in native or foreign documents or market, the present invention fully complies with the regulations of the Patent Act.

The detailed description set forth above is a specific illustration for preferred embodiments of the present invention. However, these embodiments are not intended to limit scope of the present invention, and equivalents or modifications which do not depart from the spirit of the present invention should also be included in the scope of the present invention.

What is claimed is:

1. An eccentric valve (10), comprising:
   a valve body (11), a through hole (111) being provided at the center of the valve body (11), and a first shaft hole (112) passing through the through hole (111) being provided in a longitudinal direction of the valve body (11);
   a valve seat (12) which is ring-shaped, an inner surface (121) of the valve seat (12) consisting a part of a tapered face of an oblique cone (1210), the valve seat (12) being accommodated in the through hole (111) and disposed in the valve body (11), the peak of the oblique cone (1210) offsetting a first axial centerline (1111) passing through the center of the through hole (111);
   a valve unit (13) which is disc-shaped and has an annular surface (131), a pair of second shaft holes (132) being provided in a longitudinal direction of the valve unit (13), the valve unit (13) being accommodated in the through hole (111), the pair of second shaft holes (132) being aligned with the first shaft hole (112);
   a valve stem (14) which is bar-shaped, the valve stem (14) penetrating the first shaft hole (112), passing through the through hole (111) and penetrating the pair of second shaft holes (132), thereby controlling the rotation of the valve unit (13) in the through hole (111), a second axial centerline (141) passing through the center of the valve stem (14) being oblique with respect to the first axial centerline (1111); and
   a seal (15) which is a centrosymmetric ring, an outer surface (151) of the seal (15) being a cambered surface with a fixed curvature, the seal (15) being mounted on the annular surface (131) of the valve unit (13), the disposal position of the seal (15) on the annular surface (131) of the valve unit (13) deviating from the disposal position of the pair of second shaft holes (132),
   wherein when the valve unit (13) rotates in the through hole (111) to a position where the through hole (111) is completely closed, on any radial cross-section of the eccentric valve (10), the outer surface (151) of the seal (15) presses against the inner surface (121) of the valve seat (12), and no gap exists between the outer surface (151) and the inner surface (121) of the valve seat (12), each point where the outer surface (151) of the seal (15) presses against the inner surface (121) of the valve seat (12) is a point of tangency, with all points of tangency not locating on a same plane.

2. The eccentric valve (10) of claim 1, further comprising an annular liner (16) disposed approximate the annular surface (131) of the valve unit (13), mounted to the valve unit (13) and adjacent to the seal (15).

3. The eccentric valve (10) of claim 1, wherein a radius of curvature for the outer surface (151) of the seal (15) is determined by a vertical distance (L) between the peak of the oblique cone (1210) and the center of the valve stem (14), a vertical distance (D) between the peak of the oblique cone (1210) and the first axial centerline (1111), a vertical distance (H) between an axial centerline (152) of the seal (15) and the centers of the pair of second shaft holes (132) of the valve unit (13), and a thickness (T) of the valve seat (12) in the axial direction thereof, wherein the vertical distance (D) between the peak of the oblique cone (1210) and the first axial centerline (1111) is less than the radius of the through hole (111).

4. The eccentric valve (10) of claim 3, wherein the outer surface (151) of the seal (15) has a radius of curvature ranging from 8 mm to 60 mm.

\* \* \* \* \*